United States Patent [19]

Carswell et al.

[11] Patent Number: 5,162,382
[45] Date of Patent: * Nov. 10, 1992

[54] POLYURETHANES CONTAINING MULTIPURPOSE ADDITIVES

[75] Inventors: Robert Carswell; Hugo E. Bernardi, both of Lake Jackson, Tex.

[73] Assignee: The Dow Chemical Company, Midland, Mich.

[ * ] Notice: The portion of the term of this patent subsequent to Dec. 3, 2008 has been disclaimed.

[21] Appl. No.: 734,373

[22] Filed: Jul. 22, 1991

Related U.S. Application Data

[63] Continuation-in-part of Ser. No. 398,802, Aug. 25, 1989.

[51] Int. Cl.$^5$ ............... C08G 18/16; C08G 18/04; C08G 18/18
[52] U.S. Cl. .................... 521/51; 521/105; 521/137; 521/155; 521/163; 528/73; 428/424.6
[58] Field of Search ............. 521/105, 51, 137, 163, 521/155; 528/73

[56] References Cited

U.S. PATENT DOCUMENTS 4,125,487 11/1978 Olstowski ..................... 521/137

Primary Examiner—John Kight, III
Assistant Examiner—Shelley Wright

[57] ABSTRACT

A flexible or semi-flexible polyurethane foam composition prepared from a formulation comprising a catalytic amount of an additive containing (1) a urea compound, and (2) a transition metal salt of a carboxylic acid wherein the metal is selected from Groups I-B, II-B, V-A, IV-B, V-B, VI-B, VII-B or VIII of the Periodic Table of the Elements; the additive containing a sufficient quantity of at least one amine group-containing material such that the transition metal salt is soluble in the additive; and water as a blowing agent. In preferred embodiments water is the sole blowing agent. The polyurethanes exhibit relatively short demolding times and improved mold release properties. They also show a reduced tendency to cause discoloration or staining of vinyl-based polymeric calddings such as polyvinyl chloride.

22 Claims, No Drawings

POLYURETHANES CONTAINING MULTIPURPOSE ADDITIVES

CROSS-REFERENCE TO A RELATED APPLICATION

The present application is a continuation-in-part application of U. S. application Ser. No. 398,802, filed Aug. 25, 1989, currently allowed.

BACKGROUND OF THE INVENTION

This invention relates to additives useful in preparing polyurethane formulations to impart specific properties to the final polyurethane product.

As is well known in the polyurethane art, polyurethanes can be prepared in a variety of forms. One commonly prepared form includes foamed polyurethanes, in which the density of the product is reduced by introduction of a blowing agent. Foamed polyurethanes are frequently molded into a desired final shape, and may be categorized as flexible, i.e., relatively low density, foams or as semi-flexible, i.e., relatively higher density materials. Polyurethanes may also be prepared as elastomeric compositions, in which there is little or no density reduction and also often significant stiffness, as is the case with reaction injection molded (RIM) materials.

In the case of molded materials, a frequently encountered problem is that of release of the cured polyurethane article from the mold. Various approaches have been tried to solve this problem with varying success. Some notable examples include the use of a metal carboxylate salt, such as zinc stearate, as is disclosed in, for example, U.S. Pat. Nos. 4,876.019 and 4,585,803. This additive is particularly successful in increasing the number of releases of a RIM article from the mold without undesirable sacrifice of the final physical properties of the article.

Another problem encountered in preparing molded polyurethane materials is that, for a number of applications particularly including automotive interior applications, the molding of the polyurethane is done directly on a sheet, or "cladding," of a vinyl-based polymer such as polyvinyl chloride. Over time there is a well-known tendency for the vinyl-based polymeric cladding to discolor or "stain", thereby reducing the marketability of the final product. Exposure to climatic extremes, such as is encountered by polyvinyl chloride-clad polyurethanes in vehicle dashboards, increases the rate of this staining.

Finally, it is well known in the art that certain catalysts are needed for many formulations in order to ensure adequate polyurethane cure to allow relatively rapid demolding time. For many purposes, especially in the automotive industry, such demolding is preferably accomplished in less than about 60 seconds from injection of the reactants into the mold. To speed the reaction and thereby allow processing by automated RIM equipment, tin carboxylate catalysts are frequently used, such as, for example, dimethyltin dilaurate.

Thus, it would be desirable to find an additive or group of additives for use in polyurethane formulations that enhances mold release properties, particularly as to multiple releases; that reduces the staining or discoloration of vinyl-based polymeric cladding adhered thereto; and that shows sufficient catalytic activity to allow for acceptable demolding times for use particularly in automated processes of various kinds.

SUMMARY OF THE INVENTION

In one aspect, the invention is a polyurethane formulation comprising (A) a catalytic amount of an additive containing (1) a urea compound, and (2) a transition metal salt of a carboxylic acid wherein the metal is selected from Groups 1-B, II-B, V-A, IV-B, V-B, VI-B, VII-B or VIII of the Periodic Table of the Elements, the additive containing a sufficient quantity of at least one amine group-containing material such that the transition metal salt is soluble in the additive; and (B) water as a blowing agent. In preferred embodiments the polyurethane is a polyurethane foam, flexible or semi-flexible, and water is the sole blowing agent.

In another aspect, the invention is a polyurethane foam, which may be flexible or semi-flexible, prepared from the formulation described hereinabove, having adhered thereto a vinyl-based polymeric cladding.

In other aspects, the invention includes processes of preparing the polyurethanes.

Compositions of the present invention exhibit the desirable properties of sufficiently rapid cure to allow acceptable demolding times for automated processing: enhanced mold release, particularly for semi-flexible polyurethane materials, and more particularly for water blown semi-flexible materials: and reduced tendency to cause discoloration or staining of vinyl-based polymeric cladding.

DESCRIPTION OF THE PREFERRED EMBODIMENTS

The formulations of the present invention include, first of all, at least one urea compound, which is suitably urea, either substituted or unsubstituted. A substituted urea advantageously is an inertly substituted urea, that is, it has substitution which does not interfere undesirably with compatibilization of the composition or with catalysis of the polyurethane-forming reaction. Urea compounds used in the practice of the invention preferably are of Formula I:

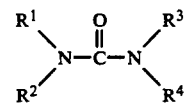

wherein $R^1$, $R^2$, $R^3$, and $R^4$ are inert substituents.

Preferably, each of $R^1$, $R^2$, $R^3$, and $R^4$ is independently selected from the group consisting of hydrogen, alkyl groups, aryl groups, arylalkyl groups, cycloalkyl groups, which groups are unsubstituted or inertly substituted. The inert substituents on the groups include, for instance, ether groups such as alkoxy groups, aryloxy groups and the like: fluorine, hydrogen, chlorine and hydroxy groups. The alkyl groups preferably have from about 1 to about 20, more preferably from about 1 to about 5 carbon atoms and include, for instance methyl, ethyl, propyl, hydroxymethyl, and methoxypropyl groups and the like. The aryl groups preferably have from about 6 to about 18, more preferably from about 6 to about 10 carbon atoms and include, for instance phenyl, p-fluorophenyl. 4-chlorophenyl, and 4-methoxyphenyl groups and the like. The alkyl aryl groups preferably have from about 7 to about 30, more preferably from about 7 to about 25 carbon atoms and include, for instance p-methyl phenyl, m-ethylphenyl and the like. The arylalkyl groups preferably have from about 7 to about 10 carbon atoms and include, for instance benzyl, 2-phenylmethyl groups and the like. The cycloalkyl groups preferably have from about 4 to about 10 carbon atoms for instance cyclohexyl, methyl cyclohexyl, and cyclobutyl groups and the like. The alkoxy groups preferably have from about 1 to about 25 and include, for instance methoxy, ethoxy, and propoxy groups and the like. The aryloxy groups preferably have from about 6 to about 30, more preferably from about 6 to about 25 carbon atoms and include, for instance, phenoxy, and p-fluorophenoxy groups and the like. Substituents having the indicated ranges of carbon atoms are preferred because they exhibit desirable levels of solubility as well as catalytic and compatibilizing activity in combination with the metal carboxylates as described hereinbelow.

In Formula I, at least two of $R^1$, $R^2$, $R^3$, and $R^4$ are preferably hydrogen: more preferably, at least two of the hydrogen atoms are on the same carbon atom (e.g. $R^1$ and $R^2$ are both hydrogen). Most preferably, at least three, and even more preferably all 4 of $R^1$, $R^2$ $R^3$, and $R^4$ are hydrogen atoms. Preferred urea compounds include, for example, urea, 1-methylurea, and 1,1-diethyl urea. The most preferred compound is urea.

Secondly, the formulations of the present invention contain at least one transition metal salt of a carboxylic acid (hereinafter transition metal carboxylate). The transition metal carboxylates are the salts of a metal cation from Groups IVB, VB, VIIB, VIII, IB, IIB and VA of the Periodic Table of the Elements with at least one carboxylate anion, that is the anion of an organic material having at least one carboxylic acid group. All valences of the transition metals in the transition metal carboxylates are preferably filled with carboxylate anions; alternatively, the transition metal carboxylates include transition metal salts having metal-metal bonds, or, preferably, ionic bonds to anions other than carboxylate anions, but not bonds directly to carbon as in alkylmetals. The transition metals include such metals as Ti, Zr, Ta, Cr, Mn, Mo, Fe, Co, Ni, Cu, Sb, Bi, Zn and the like. Preferred metals are Zn, Cu, Sb, and Cd: more preferred, Sb, Cd and Zn; and Zn, most preferred. These preferences are based on stability and reactivity under conditions present in polyurethane forming processes. Suitable carboxylate anions include anions of saturated or unsaturated carboxylic acids having from about 2 to about 30, preferably from about 8 to about 21 carbon atoms, more preferably from about 10 to about 18 carbon atoms because these chain lengths are more effective in internal mold release. Suitable transition metal carboxylates preferably include zinc stearate, zinc laurate, zinc myristate, zinc palmitate, copper stearate, copper laurate, copper oleate, copper palmitate, cadmium laurate, cadmium stearate, cadmium palmitate; antimony laurate, antimony stearate, nickel stearate, nickel oleate, nickel palmitate, nickel laurate and the like. Particularly suitable are the zinc carboxylates which include, for example, zinc stearate, zinc oleate, zinc palmitate, zinc laurate, zinc stearoyl sarcosinate, zinc oleoyl sarcosinate, zinc palmitoyl sarcosinate, zinc lauroyl sarcosinate; with zinc stearate, zinc laurate, and zinc myristate being more preferred: and zinc laurate being most preferred.

Together, the urea compound and transition metal carboxylate are present in amounts sufficient to catalyze reaction of an active hydrogen-containing components with a polyisocyanate and, when an alkylene glycol is used in the formulation, in amounts which are also sufficient to compatibilize the relatively high equivalent weight active hydrogen compound and the alkylene glycol in the composition. Such compatibilization is described more fully in the parent case hereto, which is U.S. patent application Ser. No. 398,802, filed Aug. 25, 1989, currently allowed. The term "compatibilize" is used herein to denote that the composition is capable of remaining in a single phase (i.e., neither cloudy nor separated) for at least 10 days of storage at a temperature of at least about 20° C. However, benefits of the combination of urea and the metal carboxylate as used in the present invention can be seen whether or not such compatibilization is needed.

The presence of sufficient urea compound and transition metal carboxylate to provide sufficient reactivity of the composition in polyurethane formation is indicated by formation of a gel which generally rapidly forms a hard polymer within at least about 40 seconds, preferably from about 0.5 to about 25 seconds, more preferably from about 10 to about 20 seconds from mixing of active hydrogen and polyisocyanate components. Preferably there is sufficient catalytic activity to provide sufficient reactivity to permit removal of a molded part from the mold in less than about 60 seconds from the time components are injected into the mold, which is defined as the demolding time. The demolding time is preferably from about 1 to about 30 seconds, more preferably from about 1 to about 20 seconds, which are the demolding times commonly found useful in automated RIM processes. In the case of integral skin and semi-flexible foams however, longer demolding times, preferably less than about 4 minutes, are particularly suitable. Integral skin foams generally have interior densities of from about 75 to about 450, preferably from about 150 to about 350 Kg/m$^3$ (kilograms/cubic meter), whereas other RIM produced polyurethanes generally have densities of from about 600 to about 1500, preferably from about 900 to about 1200 Kg/m$^3$. Semi-flexible foams generally have overall densities of from about 50 to about 200 Kg/m$^3$.

Preferably, the amounts of urea compound are sufficient to compatibilize the glycol, when present, and relatively high equivalent weight active hydrogen compound and preferably range from a urea:glycol ratio (weight:weight) of about 1:1 to about 1:15, more preferably about 1:2 to 1:12, and most preferably about 1:3 to about 1:6. An excess of urea compound often results in formation of a gel in the active hydrogen composition, especially when urea (unsubstituted) rather than a substituted urea is used.

Preferably, from about 0.1 to about 10, more preferably from about 0.5 to about 5, and most preferably from about 1 to about 3 parts by weight transition metal carboxylate per 100 parts by weight of the relatively high equivalent weight active hydrogen compounds which are present are employed. The ratio of the urea compound to the transition metal carboxylate is preferably from about 1:4 to about 10:1. more preferably from about 1:2 to about 5:1. These amounts of the transition metal carboxylate and urea compound help to ensure maintenance of sufficient reactivity and desirable mold release characteristics for the formulations, particularly for semi-flexible and water blown formulations but also for a wide range of other types of polyurethane formulations, and also provide compatibilization when formulations containing an alkylene glycol are employed.

In addition to the relatively high equivalent weight active hydrogen compound and glycol chain extender, compositions of the invention preferably contain at least one amine. When the relatively high equivalent weight active hydrogen compound contains amine groups, and both compatibilization of any glycol in the composition, if needed, and solution of the transition metal carboxylate can be achieved without an additional amine compound, the additional amine compound is not needed. Otherwise, an amine is generally needed. Use of an amine compound is especially preferred when there are more than about 10 parts by weight of glycol per hundred parts by weight of any incompatible relatively high equivalent weight compound (usually having a molecular weight greater than 1,000) and when a flexural modulus of at least about 5,000 psi is desired in a polyurethane prepared from the composition. Under certain circumstances the amine compound can additionally provide catalysis, chain extension, aid in mold release or other functions. Examples of amines useful as chain extenders or cross-linking agents, for instance, are described in U.S. Pat. Nos. 4,269,945; 4,433,067 and 4,444,910, which are incorporated herein by reference in their entireties. Use as an active hydrogen component, for instance, is described in U.S. Pat. Nos. 4,719,247 and 4,742,091, which are incorporated herein by reference in their entireties. Use in an internal mold release composition, for instance, is described in U.S. Pat. Nos. 4,876,019 and 4,585,803, which are incorporated herein by reference in their entireties.

Suitable amines which can be employed herein as a component in the composition of the invention include any aliphatic, cycloaliphatic, or aromatic compound containing at least one primary, secondary or tertiary amine group. The amines are, optionally, inertly substituted, that is, substituted with groups which do not undesirably interfere with the reactions of the amine group. Inert substitution includes, for instance, alkyl groups, cycloalkyl groups, aryl groups, arylalkyl groups, nitro groups, sulfate groups, sulfone groups, ether groups, hydroxyl groups, urethane groups, urea groups and the like. Amines having alkyl, aryl, cycloalkyl, arylalkyl, ether and hydroxyl groups are preferred.

Preferred amines include unsubstituted or ether-substituted aliphatic or cycloaliphatic primary or secondary mono-amine compounds: trialkyl amines; hydroxyl amines, including alkyl diethanolamines, diethanolamine and dialkyl hydroxyl amines; tertiary amines such as those described in U.S. Pat. No. 4,585,803. and low equivalent weight aliphatic and aromatic amine active hydrogen containing compounds, such as amine terminated polyethers of less than about 500, preferably from about 200 to about 500 molecular weight, hexamethylene diamine, diethylenetriamine, and hydrocarbyl substituted aromatic amines such as, for example, diethylenetoluenediamine. An unsubstituted or ether-substituted aliphatic or cycloaliphatic primary mono-amine compound preferably contains from about 4 to about 8 carbon atoms. An unsubstituted or ether-substituted aliphatic or cycloaliphatic secondary monoamine compound preferably contains from about 6 to about 12 carbon atoms. An alkyl diethanol amine preferably has an alkyl group containing from about 2 to about 8 carbon atoms. A dialkyl hydroxyl amine preferably contains about 4 to about 10 carbon atoms. In a trialkylamine, each alkyl group preferably has from about 2 to about 4 carbon atoms. Amines having these ranges of carbon atoms are preferred because these amines are effective compatibilizers. Amines described as useful with internal mold release agents in U.S. Pat. No. 4,876,019, incorporated herein by reference in its entirety, are particularly preferred because they are effective in achieving solution of the internal mold release agents.

Suitable amines include, for example, oleyl amine, coco amine, tall oil amine, ethanolamine, diethyltriamine, ethylenediamine, propanolamine, aniline, mixtures thereof and the like. Other exemplary amines include n-butylamine, amylamine, n-hexylamine, n-octylamine, sec-butylamine, 1-amino-2-ethoxyethane, 1-amino-1-methyl hexane, cyclohexylamine, di-n-propylamine, ethylpropylamine, di-n-butylamine, di-n-hexylamine, di-sec-butylamine, ethyldiethanolamine, n-propyldiethanolamine, n-butyldiethanolamine, n-hexyldiethanolamine, diethylhydroxylamine, di-n-propylhydroxylamine, di-n-butylhydroxylamine, triethylamine, tri(n-propyl)amine, tri(n-butyl)amine, ethyl di(n-propyl)amine, diethanolamine and the like. Suitable tertiary amines include triethylenediamine, N-methyl morpholine, N-ethyl morpholine, diethylethanolamine, N-coco morpholine, amino ethyl piperazine, 1-methyl-4-dimethylaminoethyl piperazine, 3-methoxy-N-dimethylpropylamine, N,N-diethyl-3-diethylaminopropylamine, dimethylbenzyl amine and the like. Particularly suitable amines include aminated polyoxyalkylene glycols, hexamethylene diamine, diethylene triamine, and hydrocarbyl substituted aromatic amines such as diethylenetoluenediamine.

The amount of amine present is not critical to this invention, but is advantageously determined by the purpose served by the amine in a given formulation. Preferably such amine is sufficient to compatibilize the mold release agent according to the teachings of U.S. Pat. Nos. 4,876,019 or 4,585,803. The invention is most useful in compositions containing sufficient amine to result in loss of activity of a tin-containing catalyst for the formation of polyurethanes. Preferably, at least about 0.1, more preferably about 0.05 to about 4, most preferably about 0.2 to about 1 part of amine is used per part of alkylene glycol chain extender because these amounts of amine aid in achieving compatibility of glycols in active hydrogen compounds using amounts of urea insufficient to result in gels in the active hydrogen composition. Most preferably, the composition contains about 0.5 to about 20, even more preferably from about 1 to about 20 parts of the amine per 100 parts of relatively high equivalent weight active hydrogen compound because these amounts of amine are effective in preparing solutions of transition metal carboxylates. It is within the skill in the art to ascertain relative proportions of relatively high equivalent weight compound, alkylene glycol if desired, urea compound, transition metal carboxylate, and, optionally, amine useful in a specific application using the teachings herein. Amounts required for compatibilization, when needed, and catalysis are functions of characteristics of the composition such as the identity and amounts of components in the composition. For instance, when an amine present in the composition acts as a compatibilizer, the amount of urea compound needed for compatibilization is advantageously reduced. When another component, for instance, an amine has catalytic activity, relatively less urea compound and transition metal carboxylate may be needed to ensure adequate catalysis and also to provide desirable other benefits of the present invention, such as mold release and reduced staining of vinyl-based polymeric cladding.

As is well known in the art, a polyurethane formulation typical includes one or more polyisocyanates and one or more isocyanate-reactive, e.g., active hydrogen containing, compounds. Any suitable organic compound containing at least two active hydrogen containing groups as determined by the Zerewitinoff method may be used as an active hydrogen compound. Active hydrogen compounds are compounds having hydrogen containing functional groups which will react with an isocyanate group. The Zerewitinoff test described by Kohler in the *Journal of the American Chemical Society*, Vol. 49, page 3181 (1927) predicts the tendency of a hydrogen-containing group to react with isocyanates. Suitable active hydrogen compounds are those conventionally employed in the preparation of polyurethanes such as the compounds described in U.S. Pat. No. 4,394,491, particularly in columns 3 through 5 thereof, wherein the compounds are called polyahls, which patent is incorporated herein by reference in its entirety.

The equivalent weight of the active hydrogen compound is not critical, although as noted hereinabove it has been shown in parent application U.S. patent application Ser. No. 398,802, filed Aug. 25, 1989, now allowed, that the use of the transition metal carboxylate and urea together is also effective for compatibilizing relatively high equivalent weight active hydrogen compounds and relatively low equivalent weight active hydrogen compounds which are present in normally incompatible proportions. The term "relatively high equivalent weight" is used to refer to an equivalent weight (molecular weight per active hydrogen-containing group e.g. —OH, —NH$_2$, —SH) of at least about 500, preferably from about 500 to about 5000. The equivalent weight is preferably from about 700 to about 3000, and more preferably from about 1000 to about 2000. The relatively high equivalent weight active hydrogen compound also advantageously contains an average of at least about 1.8, preferably from about 1.8 to about 6, more preferably about 4 to about 6, nominal active hydrogen containing groups per molecule. The active hydrogen groups are preferably hydroxyl groups, amine groups or mixtures thereof: more preferably hydroxyl groups.

Relatively high equivalent weight active hydrogen components most commonly used in polyurethane production are those compounds having at least two hydroxyl groups, which compounds are referred to as polyols. Representatives of the suitable polyols are generally known and are described in such publications as *High Polymers*, Vol. XVI, "Polyurethanes, Chemistry and Technology" by Saunders and Frisch, Interscience Publishers, New York, Vol. I, pp. 32–42, 44–54 (1962) and Vol. II, pp 5–6 and 198–199 (1964); *Kunststoff-Handbuch*, Vol. VII, Vieweg-Hochtlen, Carl-Hanser-Verlag, Munich, pp. 45–71 (1966); and *Organic Polymer Chemistry* by K. J. Saunders, Chapman and Hall, London, pp. 323–325 (1973) and *Developments in Polyurethanes*, Vol. 1, J. M. Buist, ed., Applied Science Publishers pp. 1–76 (1978).

Typical polyols include polyester polyols, polyester amide polyols, and polyether polyols having at least two hydroxyl groups. Polyethers and polyesters having hydroxyl terminated chains are preferred for use as relatively high equivalent weight active hydrogen containing compounds for use in polyurethanes suitable for use in the practice of the invention. Examples of polyols also include hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers, including polythioethers, acetals, including polyacetals.

Polyether polyols are preferably employed in the practice of this invention because they are resistant to hydrolysis. Preferred among polyether polyols are polyalkylene polyether polyols including the polymerization products of oxiranes or other cyclic ethers such as tetramethylene oxide in the presence of such catalysts as boron trifluoride, potassium hydroxide, triethylamine, tributyl amine and the like, or initiated by water, polyhydric alcohols having from about two to about eight hydroxyl groups, amines and the like. Illustrative alcohols suitable for initiating formation of a polyalkylene polyether include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, alpha-methyl glucoside, pentaerythritol, erythritol, pentatols and hexatols. Sugars such as glucose, sucrose, fructose, maltose and the like as well as compounds derived from phenols such as (4,4'-hydroxyphenyl)2,2-propane, and the like are also suitable polyhydric alcohols for forming polyether polyols useful in the practice of the invention.

The polyether is more preferably a polymer of one or more $C_2$–$C_8$ cyclic ethers such as ethylene oxide, propylene oxide, butylene oxide, styrene oxide, tetrahydrofuran, and the like. Di- and/or trifunctional polymers of ethylene oxide and/or propylene oxide are preferred. The preferred polyethers are suitably block or random copolymers of propylene and ethylene oxide: but are more preferably block copolymers, most preferably block copolymers having ethylene oxide blocks at the termini of the polyethers such that there are primary hydroxyl groups on the polyethers. Such block copolymers are referred to as ethylene oxide capped polyols. The ethylene oxide caps preferably comprise at least about 10 weight percent of the polyol to produce high reactivity desirable for RIM processes.

Polyamines are also suitable for use in relatively high equivalent weight active hydrogen components in polyurethanes and include polyether polyamines: polyester polyamines: amine-functional polymers such as amine functional acrylates. amine terminated acetal resins, amine terminated urethanes, amine containing polyesters, and the like. Suitable amines include those having terminal primary or secondary aliphatic or aromatic amine groups, including those having terminal aromatic amine functionality such as p-amino phenoxy groups, p-amino m-methyl-N-phenyl carbamate groups and the like. Compositions of amines with polyols are also suitably used as active hydrogen components. When amines are used as at least a portion of the active hydrogen component, polyurea and polyureaurethane linkages are formed. Useful amines include polyoxyalkylene polyamines and cyanoalkylated polyoxyalkylene polyamines having equivalent weights preferably from about 500 to about 10,000 and, more preferably, from about 500 to about 5000.

Among amines, amine-terminated polyethers are preferred for use in the practice of the invention. Amine-terminated polyethers are prepared from the polyether polyols described above by amination thereof. Amination is described in, for example, U.S. Pat. Nos. 3,161,682; 3,231,619; 3,236,895: 3,436,359: and 3,654,370, which are incorporated herein by reference. For amination, it is generally desirable that the terminal hydroxyl groups in the polyol be essentially all secondary hydroxyl groups for ease of amination. Secondary hydroxyl groups are introduced into a polyol produced from ethylene oxide by capping the polyol with higher alkylene oxides, that is, with alkylene oxides having more than two carbon atoms. Alternatively, secondary hydroxyl groups result from producing a polyol from higher alkylene oxides.

Generally, amination does not result in replacement of all the hydroxyl groups by amine groups. An aminated polyether polyol is selected to have a percentage of amine groups relative to hydroxy groups of from 0 to 100, preferably from about 5 to about 95 percent, depending on the physical properties desired in a resulting polyurethane. The amine groups are generally primary, but secondary amine groups may be formed. Beneficially, the amine-terminated polyols have an average functionality of from about 2 to about 6 amine groups per molecule. In the case of amines, the term "functionality" is used herein to refer to the number of amine groups, which may be primary or secondary, in the molecule. Advantageously, the amine-terminated polyols have an average equivalent weight of at least about 500, preferably an average weight per active hydrogen-containing group from about 500 to about 5000, more preferably from about 500 to about 2500. The process of utilizing aminated polyols disclosed in U.S. Pat. Nos. 4,530,941 and 4,444,910 illustrate processes for using such compounds. Those patents are incorporated herein by reference.

The formulations of the present invention may also include, as a chain extender, an alkylene glycol, preferably an $\alpha,\delta$-alkylene glycol, which can be compatibilized in the compositions of the present invention, when used with a relatively high equivalent weight active hydrogen compound in incompatible proportions.: Suitable alkylene glycols include those having from about 2 to about 8, preferably about 2 to about 6, more preferably about 2 to about 4 carbon atoms. Exemplary chain extenders include ethylene glycol, 1,4-butanediol, 1,6-hexamethylene glycol, 1,8-octanediol and the like. Ethylene glycol and 1,4-butanediol are most preferred.

Although the compositions of the present invention may contain an amount of glycol chain extender at which the chain extender and relatively high equivalent weight active hydrogen compound are normally incompatible in the absence of a stabilizer, the composition preferably contains about 5 to about 60, more preferably about 10 to about 40 parts by weight of chain extender per 100 parts by weight relatively high equivalent weight active hydrogen compound because vitrification is often observed when there is present more than about 40 parts of glycol. It has been found that polyurethanes having particularly desirable properties may be prepared from blends containing an amount of chain extender within the preferred and more preferred ranges.

The active hydrogen component, admixed if desired with other components as described hereinabove, is reacted with at least one polyisocyanate component to form a polyurethane. Both aliphatic and aromatic diisocyanates are useful for this purpose. Suitable aromatic diisocyanates include, for example, m-phenylene diisocyanate, p-phenylene diisocyanate, 2,4- and/or 2,6-toluene diisocyanate (TDI), naphthylene-1,5-diisocyanate, 1-methoxyphenyl-2,4-diisocyanate, 4,4'-biphenylenediisocyanate, 3,3'-dimethoxy-4,4'-biphenyldiisocyanate, 2,4'- and/or 4,4'-diphenylmethanediisocyanate (MDI) and derivatives thereof including polymeric derivatives. Preferred among the aromatic polyisocyanates are the isomers and derivatives of TDI and MDI.

Exemplary aliphatic polyisocyanates include isophorone-diisocyanate, cyclohexane diisocyanate, hydrogenated diphenylmethanediisocyanate ($H_{12}MDI$), 1,6-hexamethylenediisocyante and the like. Of these, hexamethylenediisocyanate and $H_{12}MDI$ are most preferred.

Biuret, urethane, urea, uretonimine and/or carbodiimide containing derivatives, including prepolymers, of the foregoing polyisocyanates are also suitable.

In preparing the polyurethane, the polyisocyanate is employed in an amount to provide about 0.9 to about 1.5, preferably about 1.0 to about 1.25, more preferably about 1.0 to about 1.05, isocyanate groups per active hydrogen-containing group present in the reaction mixture. These ratios of isocyanate groups to active hydrogen-containing group are referred to herein as isocyanate index.

The formulations of the present invention can be prepared by any admixing of active hydrogen, i.e., isocyanate reactive, compound, urea compound, transition metal carboxylate, and glycol chain extender if desired, that results in a homogeneous composition. Preferably, a first admixture of the urea and a glycol chain extender is formed, advantageously by shaking or stirring the materials together, preferably at about ambient temperature for convenience. When an amine is used, a second admixture of the transition metal carboxylate and the amine is formed, advantageously by mixing them at a temperature of at least about 50° C. until there is no visible evidence of two phases. preferably for at least about 30 minutes. The two admixtures are then combined with the relatively high equivalent weight compound and stirred using mild heat, e.g., about 35° C., as necessary to achieve a single phase. Alternatively, the urea compound or the carboxylate can be solubilized in the isocyanate compound.

In addition to the foregoing critical components, other additives which are useful in preparing polyurethanes may be present in the stabilized composition. Among these additives are catalysts, blowing agents, surfactants, crosslinkers, antioxidants, UV absorbers, preservatives, colorants, particulate fillers, reinforcing fibers, antistatic agents, internal mold release agents and the like.

Suitable blowing agents, which are optionally employed herein, include water, halogenated methanes such as methylene chloride, dichlorodifluoromethane, trifluoromonochloromethane and the like, the so-called "azo" blowing agents, finely divided solids and the like. Preferably, water is selected as at least one blowing agent, and more preferably water is used as the sole blowing agent. However, in preparing noncellular or microcellular polyurethanes the use of these blowing agents is not preferred. In making microcellular polyurethanes, having a density from about 600 to about 1500 $Kg/m^3$, it is preferred to reduce density by dissolving or dispersing a gas such as dry air or nitrogen into the composition prior to its reaction with a polyisocyanate. Production of semi-flexible polyurethanes, such as for automotive interior trim and the like, is particularly preferred, and more preferred is production of such using water, preferably alone or, in another embodiment, in combination with other blowing agents.

Suitable surfactants include silicone surfactants and fatty acid salts, with the silicone surfactants being preferred. Such surfactants are advantageously employed in an amount from about 0.01 to about 2 parts per 100 parts by weight relatively high equivalent weight active hydrogen compound.

Suitable fillers and colorants include calcium carbonate, alumina trihydrate, carbon black, titanium dioxide, iron oxide, flaked or milled glass, mica, talc and the like. Suitable fibers include glass fibers, polyester fibers, graphite fibers, metallic fibers and the like.

While additional catalysts for forming polyurethanes are, optionally, present in addition to the amine, urea and transition metal carboxylate in the compositions of the invention, additional catalysts are advantageously not necessary and, preferably, are not used. When additional catalysts are used, they are preferably catalysts which do not exhibit a substantial loss of activity when stored with other components of the compositions for times suitable for particular applications. More preferably, the catalysts lose less than about 50, most preferably less than about 25 percent of their reactivity (as measured by gel time) when stored with other components of a composition of the invention for a period of at least about 6 months at a temperature of at least about room temperature (e.g. 25° C.). More preferably, tetravalent organometallic tin-containing catalysts which lose activity in the presence of amines, such as dialkyl tin dicarboxylates, tetraalkyl tins and tin oxides, particularly stannous oxide, are present in amounts insufficient to substantially increase the rate of polyurethane formation, (as measured by gel time). An increase of less than about 10 percent in gel time is considered insubstantial. Most preferably there is less than about 0.001 weight percent tetravalent tin catalyst. Specific catalysts are within the skill in the art and include those catalysts described, for instance, in U.S. Pat. No. 4,269,945, particularly column 4, line 46 through column 5, line 25, which is incorporated herein by reference.

The reaction of the components used in the present invention is preferably carried out by forming a mixture therewith and introducing the mixture into a suitable mold for curing. Conventional casting techniques may be used, wherein the components are mixed and poured into the mold, where they cure upon heating. However, especially when more reactive components are used, it is preferred to conduct the reaction using a reaction injection molding (RIM) process. In such process, the components are subjected to high shear impingement mixing and immediately injected into a closed mold where curing takes place. In either the conventional casting or RIM techniques, in-mold curing takes place at least to an extent that the part retains its shape during demolding and subsequent handling. However, complete curing, i.e., curing to a point at which no additional discernable reaction occurs, may take place either in the mold or in a post-curing step which is conducted after demolding. If needed, postcuring of the polyurethane is advantageously conducted at a temperature of from about 250° F. to about 350° F. for a period of from about 1 minute to about 24 hours, preferably about 1 minute to about 3 hours.

While the invention is useful in forming any polyurethane, particularly a molded polyurethane, it is particularly useful in the preparation of elastomeric polyurethanes using automated RIM processes. The invention is particularly important in producing high modulus RIM polyurethanes, preferably those having a flexural modulus greater than about 2,000 psi, more preferably greater than about 5,000 psi, most preferably greater than about 10,000 psi, and even more preferably greater than 20,000 psi as measured by the procedure of ASTM D-747-86. Polyurethanes of the invention are often used to prepare automobile parts such as fascia, molded window gaskets, bumpers, stearing wheels, vehicle armrests, dashboards and other interior trim and the like, as well as for non-automotive uses such as beer barrel skirts, shoe soles and the like.

When polyurethanes prepared from the compositions of the invention are molded, particularly in a RIM process, they advantageously exhibit self release properties, that is, they release from a mold more easily than do polyurethanes containing the same other components, but not containing the combinations of urea and transition metal carboxylate of the invention. Particularly unexpectedly, semi-flexible polyurethanes, which are generally microcellular, exhibit self release properties and, when applicable, experience compatibilization of glycols. Such release properties are observed even when the polyurethane has been blown in part or, especially, solely with water.

In a particularly preferred embodiment of the present invention, the polyurethane is molded using a vinyl-based polymer as a substrate. For example, a polyvinyl chloride sheet may be placed into the mold at a desired location such that the polyurethane cures, with or without the formation of cells to reduce density, against and adhered to the sheet. In the present invention, the combination of the transition metal carboxylate and the amine along with the urea results in both improvement of the adhesion as well as the reduction of the tendency of the vinyl-based polymer to discolor with time. Particularly preferred for use herein is a polyvinyl chloride cladding.

The following examples are provided to illustrate the invention but are not intended to limit the scope thereof. All parts and percentages are by weight unless otherwise indicated.

EXAMPLE 1

A formulation for preparing a semi-flexible polyurethane, consisting of the components and amounts shown in Table 1, is prepared using conventional polyurethane mixing and formulation techniques.

TABLE 1

| Component | Amount (parts based on 100 parts of polyol) |
|---|---|
| Polyether Polyol[1] | 60 |
| Copolymer Polyol[2] | 40 |
| Cell opener[3] | 4 |
| Triethanolamine 85% | 1.5 |
| Water | 2.2 |
| Amine-containing Compound[4] | 2 |
| Zinc Laurate | 2 |
| Urea | 1 |
| Surfactant[5] | 0.65 |

[1] A 5,000 molecular weight, glycerin-initiated, ethylene-oxide capped polyether polyol.
[2] A styrene-acrylonitrile dispersion (25 percent solids) in a 5,000 molecular weight, glycerin-initiated, ethylene oxide-capped polyol.
[3] A 12,000 molecular weight polyether polyol.
[4] An ethylene diamine initiated polyether polyol.
[5] TEGOSTAB B4113*, a silicone surfactant available from Goldschmidt Chemical Corporation.

The components shown in Table I are maintained at room temperature (60°–75° F.), and then combined with a polymeric MDI (average functionality about 2.3), in a ratio of 0.4 parts of the isocyanate to 1 part of the polyol formulation. The isocyanate is added to the formulation and mixed at 2,500 rpm for approximately 6 seconds. The resulting mixture is poured into a mold cavity measuring 6 inches by 6 inches by one-half inch. The mold is maintained at 125° F. As soon as the pour is completed the mold is closed. The mold, which has previously been treated with an external mold release known as DELIFT* release AID-14, available from Kramer Chemical Corporation, is then opened and the completed part is removed. The time in the mold is 4 minutes. The result is a semi-flexible, all-water blown part.

The experiment is repeated 10 times but without further application of the external mold release after the molding of the first part. Each of the parts releases without significant or unacceptable difficulty or deformation.

EXAMPLE 2

Comparative

The experiment of Example 1 is substantially repeated except that a different formulation is used, as described in Table 2.

TABLE 2

| Component | Amount (parts based on 100 parts of polyol) |
| --- | --- |
| Polyether Polyol[1] | 60 |
| Copolymer Polyol[2] | 40 |
| Triethanolamine 85% | 1.5 |
| Water | 2.3 |
| Amine-containing Compound[3] | 0.5 |
| Zinc Laurate | 0.5 |
| Urea | 1 |
| Surfactant[4] | 0.25 |

[1] A 5,000 molecular weight, ethylene-oxide capped polyether polyol.
[2] A styrene-acrylonitrile-containing copolymer polyol having a solids content of about 25 percent.
[3] An ethylene diamine initiated polyether polyol.
[4] TEGOSTAB B4113*, a silicone surfactant available from Goldschmidt Chemical Corporation.

The polyurethane is foamed in the mold as described in Example 1, except that a sheet of polyvinyl chloride is applied against one surface of the mold as a substrate for the polyurethane foam. An identical formulation, but lacking the urea and zinc laurate, is also prepared and foamed against an identical polyvinyl chloride substrate. A staining study is then carried out under which a sample of the urea/zinc laurate/vinyl composition and the vinyl composition lacking the urea and zinc laurate (i.e., the "conventional foam") are together subjected to 121° C. temperature for 500 hours (21 days). At the end of this time the samples are removed from the heating oven and visually examined for staining and for brittleness.

The vinyl adhered to the conventional foam shows small darker spots and is significantly more brittle. The vinyl adhered to the foam containing urea and zinc laurate exhibits no visual staining. A MINOLTA* CR200 Chromameter is used to determine the color change, called the Delta E value, of the polyvinyl chloride in the samples. The urea/zinc laurate polyvinyl chloride surface distal to the polyurethane foam shows a Delta E value of 1.9, while polyvinyl chloride without any adhered foam, but which has been subjected to the same heating process, shows a Delta E of 1.72. In contrast, the vinyl adhered to the conventional foam has a Delta E value of 7.35.

EXAMPLES 3-9

Comparative

An admixture of 10 parts by weight ethylene glycol and 2 parts of the urea compound indicated in Table 1 is formed by stirring at room temperature. After about 30 minutes, 100 parts by weight of a 5000 molecular weight, glycerine initiated poly(propylene oxide) which is ethylene oxide capped (hereinafter Polyol A) is added to the admixture and stirred for 15 minutes to form a first admixture. A second admixture of 2 parts by weight of zinc laurate with 7 parts by weight of difunctional, amine terminated poly(propylene oxide) having an average molecular weight of about 400, commercially available from Texaco Chemical Corp. under the trade designation Jeffamine ®D400 (hereinafter Amine A) is formed by stirring at about 65° C. for 30 minutes.

For each of Examples 3-9, 112 parts by weight of the first admixture is mixed with 9 parts by weight of the second admixture by stirring for 10 minutes at a temperature of about 20° C. to form a "B-Side" mixture. A sample of each "B-Side" mixture is thoroughly mixed within a sufficient sample of carbodiimide-modified diphenylmethanediisocyanate having an average equivalent weight of about 143 to produce a mixture having an isocyanate index of about 1.03.

The resulting mixture is quickly poured into a cup at room temperature, and the time from mixing the isocyanate and the "B-Side" mixture until a gel too stiff to stir manually is formed is recorded in Table 3 as the gel time.

For Comparative Samples A-G, the procedure of Examples 3-9 is followed omitting the zinc laurate and Jeffamine ®D400. Gel times for the comparative are also recorded in Table 3.

A gel time of about 40 seconds or less is interpreted as indicating that the corresponding formulation is sufficiently reactive to be commercially useful in a high pressure automatic RIM process.

TABLE 3

| Candidate Urea | Comparative Samples No.* | Comparative Samples (gel time in sec.) | Example No. | Examples (gel time in sec.) |
| --- | --- | --- | --- | --- |
| Phenyl urea | A* | 100+ (no reaction) | 1 | Immediate reaction; semisolid at 59 sec. |
| 1,1-dimethyl urea | B* | 100+ (reacts slowly to a solid polymer) | 2 | Soft solid at 21 sec. |
| 1-methyl urea | C* | 100+ | 3 | 26 |
| 1,3-dimethyl urea | D* | 100+ | 4 | 37 |
| 1,1,3,3-tetramethyl urea | E* | 100+ | 5 | 72 |
| 1,1-diethyl urea | F* | 100+ | 6 | 26 |
| Trimethylene Urea | G* | 100+ | 7 | 40 |

*indicates not an example of the present invention.

The data in Table 3 shows that, except when the urea is tetrasubstituted, formulations having polyol, glycol, urea compound, amine and zinc laurate in the "B-side" mixture exhibit sufficient reactivity to be useful in automated RIM processes, whereas certain formulations not having the amine and zinc laurate do not exhibit sufficient reactivity.

The data in Table 3 show that polymers having good physical properties can be formed using compositions of the invention with or without additional catalyst. The compositions are sufficiently reactive without additional (tin-containing) catalyst to give demolding times of 30 seconds. For comparison, it is noted that similar demolding times cannot be achieved using similar compositions that lack conventional polyurethane formation catalysts from which either the urea or the zinc laurate is omitted. When tin catalyst is used with the zinc laurate and urea, the reaction is so fast that it may be impracticable for use in some commercial RIM processes.

What is claimed is:

1. A polyurethane flexible or semi-flexible foam composition prepared from a formulation comprising
   (A) a catalytic amount of an additive containing (1) a urea compound and (2) a transition metal salt of a carboxylic acid wherein the metal is selected from Groups I-B, II-B, V-A, IV-B, V-B, VI-B, VII-B or VIII of the Periodic Table of the Elements: the additive containing a sufficient quantity of at least one amine group-containing material such that the transition metal salt is soluble in the additive; and
   (B) water as a blowing agent.

2. The composition of claim 1 wherein water is the sole blowing agent.

3. The composition of claim 1 further comprising at least one amine terminated polyether polyol.

4. The composition of claim 3 wherein the amine group-containing material is an unsubstituted or ether-substituted aliphatic or cycloaliphatic primary or secondary mono-amine compound; a trialkyl amine; a hydroxyl amine; a tertiary amine; an amine terminated polyether having a molecular weight less than about 500, hexamethylene diamine, diethylenetriamine; a hydrocarbyl substituted aromatic amine; or a mixture thereof.

5. The composition of claim 1 wherein the transition metal carboxylate salt has a metal cation selected from Ti, Zr, Ta, Cr, Mn, Mo, Fe, Co, Ni, Cu, Sb, Bi, and Zn.

6. The composition of claim 5 wherein the transition metal carboxylate salt has a metal cation selected from Zn, Cu, Sb, and Cd.

7. The composition of claim 6 wherein the transition metal carboxylate salt has a Zn cation.

8. The composition of claim 9 wherein the transition metal carboxylate salt has a carboxylate anion having from 8 to 21 carbon atoms.

9. The composition of claim 8 wherein the urea compound is represented by Formula I:

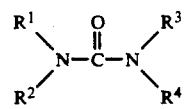

wherein $R^1$, $R^2$, $R^3$ and $R^4$ are inert substituents.

10. The composition of claim 9 wherein in Formula I each of $R^1$, $R^2$, $R^3$, and $R^4$ is independently selected from the group consisting of hydrogen, alkyl groups, aryl groups, arylalkyl groups, cycloalkyl groups, which groups are unsubstituted or inertly substituted.

11. The composition of claim 10 wherein in Formula I, at least two of $R^1$, $R^2$, $R^3$, and $R^4$ are hydrogen.

12. The composition of claim 11 wherein in Formula I, at least two of the hydrogen atoms are on the same nitrogen atom.

13. The composition of claim 12 wherein in Formula I, at least three of $R^1$, $R^2$, $R^3$, and $R^4$ are hydrogen atoms.

14. The composition of claim 13 wherein the urea compound is urea.

15. The composition of claim 1 wherein the polyurethane polymer is formed in a reaction injection molding process.

16. The composition of claim 15 wherein the polymer has a demolding time of less than about 60 seconds.

17. The composition of claim 1 wherein the polymer is an integral skin foam and has a demolding time of less than about 4 minutes.

18. The composition of claim 17 wherein the polymer is an integral skin foam and in the form of a shoe sole or shoe inner sole.

19. A cladded polyurethane composition prepared from a formulation comprising a catalytic amount of an additive containing
   (A) a urea compound, and
   (B) a transition metal salt of a carboxylic acid wherein said metal is selected from Groups I-B, II-B, V-A, IV-B, V-B, VI-B, VII-B or VIII of the Periodic Table of the Elements; the additive containing a sufficient quantity of at least one amine group-containing material such that the transition metal salt is soluble in the additive,
   wherein the polyurethane prepared therefrom is cladded on at least one surface with a vinyl-based polymer.

20. The composition of claim 19 wherein the formulation further comprises water as a blowing agent.

21. The composition of claim 20 wherein water is the sole blowing agent.

22. The composition of claim 19 wherein the vinyl-based polymer is polyvinyl chloride.

* * * * *